June 10, 1958
J. E. VALENTE
2,838,420
METHOD FOR DRYING IMPREGNATED POROUS WEBS
Original Filed May 17, 1952
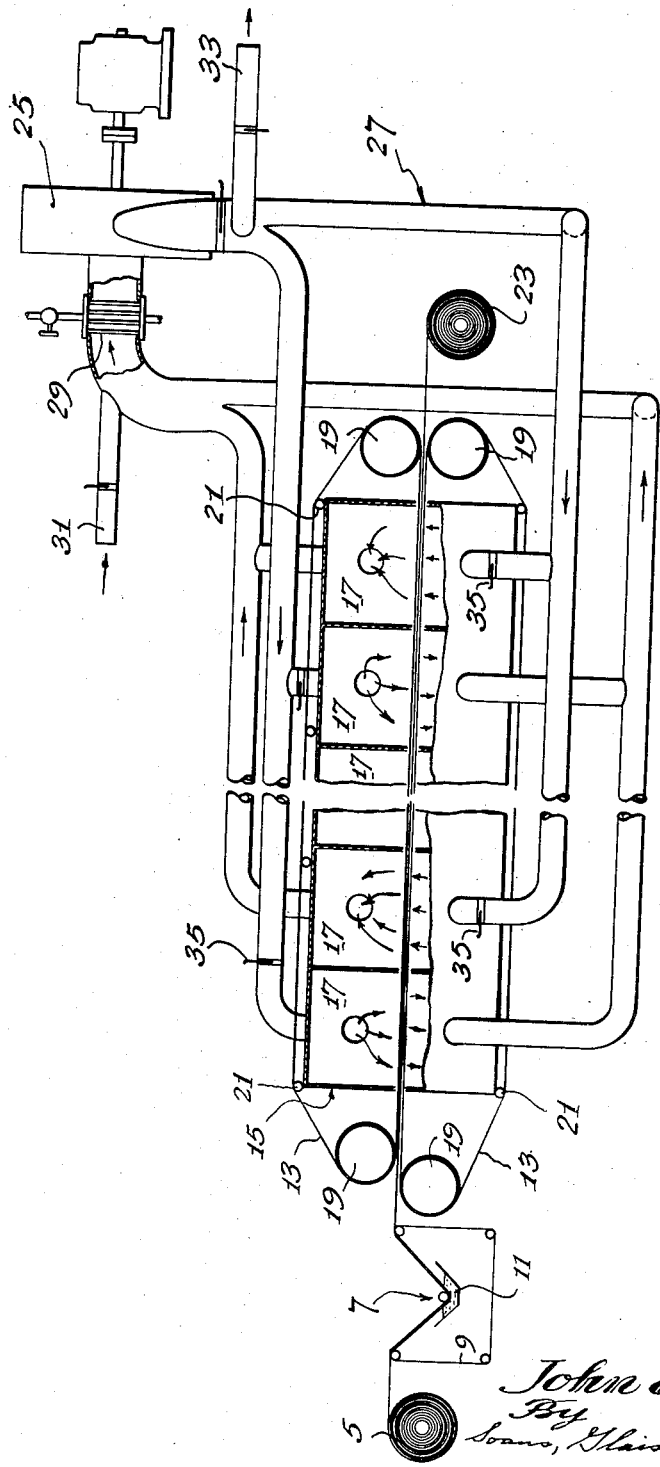
Inventor
John E. Valente
By
Soans, Plaister & Anderson
Attorneys

United States Patent Office 2,838,420
Patented June 10, 1958

2,838,420

METHOD FOR DRYING IMPREGNATED POROUS WEBS

John E. Valente, Neenah, Wis., assignor to Kimberly-Clark Corporation, Neenah, Wis., a corporation of Delaware Continuation of application Serial No. 288,406, May 17, 1952. This application August 23, 1956, Serial No. 605,896

4 Claims. (Cl. 117—103)

This invention relates to the manufacture of impregnated, porous cellulose fiber sheet or web materials, and is particularly concerned with the control of the distribution of the impregnant throughout the thickness of the web.

The problems dealt with by this invention may arise in connection with the manufacture of a variety of porous cellulose fiber webs such as water-laid, carded or air-laid webs, etc., in which an impregnant is introduced into the web by means of a liquid vehicle, and subsequently dried to "fix" or immobilize the impregnant.

In the drying of these webs by the use of conventional procedures, it is extremely difficult to obtain a finished product in which the impregnant is uniformly distributed throughout the thickness of the web because conventional drying methods tend to alter the distribution of the impregnant.

For example, in the manufacture of resin-impregnated creped cellulosic wadding of a type suitable for fabrication into various products such as filter units and the like, i. e. a relatively thick, low-density porous web, the web is uniformly impregnated with a thermo-setting resin in a relatively uncured state in the form of a solution or dispersion in water or in a suitable organic solvent. When such impregnated webs are dried in the conventional manner, i. e., by directing streams of heated air against one or both surfaces of the impregnated web, or by contact heating of the web, the uniform distribution of the resin is altered, the resin concentration being rather dense toward one or both surfaces and correspondingly deficient toward the center of the web. While the exact nature and operations of the forces causing this redistribution is not entirely understood, it is assumed to be the effect of non-uniform drying. In such case, the resin solution may migrate by capillary action to the relatively drier zone from which evaporation occurs at the greatest rate, with resultant accumulation of the resin solids in that zone.

This condition is undesirable, particularly in the case of multi-ply webs, because a deficiency of resin in the intermediate plies may weaken the inter-ply bond of the ultimate product. For this reason, it has been necessary in the past to use larger quantities of resin than would be necessary if it were possible to obtain uniform distribution of the resin in the dried, impregnated web.

Accordingly, it is the principal object of the present invention to provide a method of drying an impregnated porous web in such manner that the distribution of the impregnating material will be uniform throughout the web. A more specific object of the invention is the provision of a method of drying a multi-ply web of creped cellulosic wadding which has been impregnated with a resin solution or dispersion, so as to obtain uniform distribution of the resin throughout the several constituent plies.

In general, the method of the invention comprises passing a stream of air or gas through a web of porous material containing an impregnant distributed throughout the web in a liquid vehicle, and reversing the direction of the flow of gas one or more times before the impregnant is immobilized. For example, the basic porous web may be passed through a bath which contains the impregnant material in dissolved or dispersed form in the desired concentration, and then passed through a dryer in which gas is alternately forced through the web in opposite directions. By proper correlation of the speed of the web through the dryer, the velocity and the temperature of each of the gas streams, and the relative areas of the web exposed to adjacent streams of the gas, as will be hereinafter disclosed, satisfactorily uniform distribution of the impregnant throughout the thickness of the web can be attained. According to the nature of the web and of the impregnating material, the latter may be effectively "fixed" i. e., incapable of further redistribution, while the moisture content of the web is still relatively high, as will presently appear.

While the method of the invention may find application in several fields, it was developed in connection with, and has particular advantages when used in, the manufacture of resin-impregnated creped cellulosic wadding, and is here described in that connection.

To illustrate, the basic creped wadding sheet may have a dryer basis weight of from 4.5 to 10 lbs. per 3000 square feet, according to its ultimate use, and a crepe ratio of from 1.5 to 3.0. Such sheets have relatively low strength, particularly when wetted with the impregnating solution, and for greater ease of handling, are generally assembled in from 5 to 10 plies to form a multi-ply web having a dryer basis weight of from 22.5 lbs. to 100 lbs. per 3000 square feet.

The multi-ply web is impregnated with a solution of synthetic resin so as to obtain in the web a residual resin solids content of from 20 to 70 percent, based on the dry weight of the impregnated web, the usual desired resin content being within the range of 30 to 65 percent. A number of available synthetic resins which are water soluble or dispersible are especially suitable, a particular phenolic resin known commercially as R–468, manufactured by the Monsanto Chemical Company, being illustrative. Depending upon the impregnating technique, the desired residual resin solids content, the desired drying load, and other factors, the concentration of resin solids in the impregnating solution may vary from 30 to 70 percent. The impregnated webs are usually dried to a volatile content of approximately 8 to 11 percent of the finished weight of the web. In the ultimate use of the impregnated sheet, the resin is cured by heating, and taking a typical filter product as illustrative, the impregnated web may have a specific gravity of from 0.15 to 0.45 in its final state.

Referring to the drawing, the single figure of which illustrates schematically one form of apparatus suitable for carrying out the method of the invention, the dry, unimpregnated web is unwound from a supply roll 5, and passes into a suitable impregnating mechanism 7 which may include an endless belt or screen 9 for transporting the web through a bath 11 of the impregnating solution. The wet impregnated sheet is then carried between a pair of endless wire screens 13 through an elongated dryer 15 which is partitioned longitudinally into a series of chambers 17. In the dryer, air or other gas, preferably heated, is forced through the web, the direction of the gas flow being reversed in successive chambers. Each of the web-supporting screens 13 is supported and tensioned by a pair of large rolls 19, one at the entrance and one at the exit of the dryer, and the return runs of the screens 13 are supported by guide rolls 21 outside the dryer. On the exit side of the dryer, the dried impregnated web is rewound into a roll 23 for storage and shipment. It will be understood that the screens, the supply and re-winding rolls, and the impregnating mechanism, are driven at correlated speeds which may be varied to control the time required for a given length of web to traverse the dryer.

The drying medium, preferably hot, relatively dry air is supplied under pressure by a motor driven pump or blower 25 and delivered to the dryer through a duct system 27 which includes a suitable heat exchanger 29 using steam for example as the heating medium. For purposes of control and heat economy, a portion of the air may be recirculated, a certain amount of fresh air being continuously added and spent air being continuously bled from the system, as at 31 and 33 respectively. To suit varying requirements, it is desirable that the drying medium be available at a variable temperature and, furthermore, that suitable throttling valves or dampers 35 be disposed in the inlet conduit of each of the chambers for controlling the rate of flow of the drying medium into the individual chambers.

It has been discovered that by forcing the air through the web and by reversing the direction of the air flow under carefully controlled conditions, the migration of resin which accompanies the use of the conventional drying procedures is effectively checked. Theoretically, it may be possible, by forcing the drying medium through the web at a sufficiently high rate, to achieve a uniform rate of evaporation throughout the web thickness, but to the extent that the theoretical is not attainable, the effect of unequal evaporation is overcome by reversing the direction of the flow of the drying medium through the web. In this connection, it has been observed that the tendency of the resin solution to migrate under the force of unidirectional heating or drying disappears while the web is still quite wet, and well before the final degree of dryness necessary for satisfactory handling is reached.

When a porous cellulose fiber web is impregnated with a resin solution having a resin solids concentration of from 30% to 70% by weight, in sufficient quantity to provide in the web a resin solids content of from 20 to 70% by weight of the dried impregnated web, a portion of the solution not absorbed by the fibers exists as a continuous liquid body extending throughout the thickness of the web. This relatively free portion of the impregnating solution is present in the interstitial spaces in the web and as a film on the interconnected fibers, and is movable by capillary action, in response to unbalanced evaporation, until it is immobilized by evaporation of a sufficient quantity of the solvent. This immobilization may be partially due to increasing viscosity of the free portion of the solution, but examination of the dried web also shows discrete deposits of resin as menisci at the intersections of fibers which indicates that the continuous liquid body becomes interrupted, breaking down into many smaller bodies between which no transfer, or at best, only limited transfer of the solution is possible.

Thus, whereas an impregnated web will exhibit marked migration effects when dried solely by conventional means, or even by forcing air at practical rates through the web in one direction only, an identical web can be dried to an intermediate state of dryness by the reversing, through-drying method of the invention and then carried to final dryness by conventional means without showing any migration effects, even though the web be very soggy when the reversing through-drying is halted.

Specifically, in the case of a 6-ply web of creped cellulosic wadding having a dryer basis weight of 5.9 lbs. per 3000 square feet and a crepe ratio of about 1.9 and impregnated with an aqueous solution of a water soluble phenol-aldehyde resin containing 33% resin solids so as to achieve a residual resin solids content of about 46% by weight of the dried impregnated web, air at room temperature was forced through the web in alternately opposite directions at a velocity of about 265 feet per minute until the volatile content of the web was reduced to about 32% of the total weight of the web. The web was then dried to a final volatile content of 8.8 percent by directing a stream of air at a temperature of 176° F. through the web in one direction only. No appreciable migration of resin was found to have occurred, as evidenced by the fact that the resin contents of the individual constituent plies varied by only 1.5% resin solids.

On the other hand, when a comparable specimen of the impregnated wadding was dried from start to finish by directing a stream of air at 225° F. through the web in one direction only at a velocity of 392 feet per minute, the resin solids content of the constituent plies was found to vary from 47.8% to 36.4%, with the higher resin content occurring in the ply on the side of the web from which the air entered, and being graded downwardly to the lower figure in the ply on the side of the web from which the air left the web.

From the above observation, it is apparent that there is an intermediate state of dryness at which the resin solution becomes fixed in the web and incapable of migration, and that the alternation of the flow of the drying medium through the web, to be effective, must occur before and until this critical range or point in the drying process is reached. For cellulose fiber webs impregnated with aqueous solutions of a phenol-aldehyde thermosetting resin at resin solids concentrations suitable for impregnation, this critical degree of dryness has been found to be within the range of from 20% to 30% volatiles based on the total weight of the web.

For a given type and weight of web impregnated with a specified amount of a solution of known concentration, the critical condition of dryness will occur more rapidly as the drying rate is increased. Therefore, it is desirable for control purposes that one or several of the factors which determine the drying rate be variable. These include the speed of the web through the dryer, the temperature and degree of saturation of the drying medium, which in the case of air may vary from room condition to relatively dry air at 300° F., and the velocity of the drying medium through the web. These factors are also related to the length of each of the successive individual dryer chambers or sections which may be made variable to control the drying time in each chamber. With a relatively high drying rate, the timing of the alternation of the flow of drying medium is, of course, more critical than when the drying rate is reduced, and in such case, it will be necessary to exercise definite control to make certain that at least one and preferably more reversals of flow of the drying medium occur before the impregnating solution becomes effectively fixed in situ.

To illustrate from actual experience, and referring again to the previously cited specific example of the 6-ply web which was impregnated with an aqueous solution of a phenol-aldehyde resin at a concentration of 33% resin solids, and partially dried to a volatile content of 32% of the total weight of the web by the reverse through-drying method above described, the dryer was partitioned into eight consecutive chambers, each 24 inches in length, through which the web was moved at a speed of 20 feet per minute. As described, relatively dry air at room temperature was forced through the web in opposite directions in successive chambers at a velocity of about 265 feet per second. The partially dried web issuing from the dryer was then completely dried by hot air at 176° F. directed through the web in one direction only, and the resin content of each of the six constituent plies was found to be substantially the same.

On the other hand, when air was delivered to the dryer at a temperature within the range of from 220° F. to 290° F., other conditions remaining approximately the same, in order to reduce the final volatile content to the desired point for convenient handling, that is, approximately 10%, the resin was found to have migrated as severely as though the web had been dried by conventional surface drying means, and it was necessary to foreshorten the first chamber to a length of about 8 inches in order to eliminate the migration effect and to produce a web in which the resin was uniformly distributed. It is apparent, therefore, that at higher drying rates, the critical state of dryness of the web is reached very rapidly, and that due care must be taken, as in the instance cited, to assure that the direction of air flow through the web is reversed at least once before the critical state of dryness is reached. By the use of the drying method above described, substantially uniform distribution of the impregnant can be maintained, with the particularly beneficial result in the field of resin-impregnated multi-ply creped cellulosic wadding that sufficient resin is retained in the intermediate plies to assure good ply adhesion at lower total resin contents than are feasible when conventional drying methods are used. This results not only in substantial savings of resin but also in increased web flexibility, since the excess of resin in the outer plies is substantially eliminated. Moreover, the drying of the webs is accomplished in a fraction of the time, and with equipment which occupies far less space, than that required by conventional surface drying methods.

While the invention was conceived and developed in connection with a particular product, it may be applicable by those skilled in the art to other fields wherein porous webs of various types are impregnated with solutions, dispersions, suspensions or the like, and subsequently dried to deposit the dissolved or dispersed material, and wherein uniformity of distribution of the deposited material is desired. Accordingly, the invention is not to be construed as comprehending only the specific example set forth above, but rather as commensurate with the appended claims.

I claim:

1. The method of producing an impregnated web in which the impregnant is substantially uniformly distributed throughout the thickness of the web which comprises introducing into a porous web a volatile liquid vehicle in such quantity and containing an impregnant in low enough concentration that said vehicle is present in said web as a continuous liquid body throughout the thickness of the web and said impregnant is mobile within said web in response to forces established by drying said web, passing a gaseous drying medium through said web in alternately opposite directions before and until said continuous liquid body is interrupted but said web is still wet with said vehicle and contains a substantial quantity thereof capable of being evaporated by a conventional drying process, thereby to immobilize the impregnant in the web, and then further drying the web sufficiently to permit handling.

2. The method of producing a substantially uniformly dense fiber base plastic sheet which comprises impregnating a porous fibrous web with a resin solution in such quantity and of such resin solids concentration as to be mobile within said web in response to forces established by drying said web and to provide in the web a residual resin solids content of from 20% to 70% by weight of the dried impregnated web, passing a gaseous drying medium through said web in alternately opposite directions at least until sufficient solvent has been evaporated to reduce the volatile content of the web to from 20 to 30 percent of the total weight of the web, and then further drying the web sufficiently to permit handling.

3. The method of producing a substantially uniformly dense cellulose fiber base plastic sheet which comprises impregnating a low-density, porous cellulose fiber web with an aqueous solution of synthetic resin in amount and having a resin solids concentration such as to be mobile within said web in response to forces established by the drying of said web, and to provide in the web a residual resin solids content of from 20 to 70% by weight of the dried impregnated web, forcing unsaturated air through said web in alternately opposite directions until the volatile content of the web is reduced to within the range of from 20 to 30% of the total weight of the web, and then further drying the web sufficiently to permit handling.

4. The method of producing a substantially uniformly dense cellulose fiber base plastic sheet which comprises impregnating a multi-ply web of creped cellulosic wadding having a dryer basis weight of from 22.5 to 100 pounds per 3000 square feet with an aqueous solution of a phenol-aldehyde resin at a concentration of from 30 to 70% resin solids so as to provide in the web a residual resin solids content of from 20 to 70% by weight of the dried, impregnated web, forcing unsaturated air through said web in alternately opposite directions until the volatile content of the web is reduced to within the range of from 20 to 30% of the total weight of the web, and then further drying the web sufficiently to permit handling.

References Cited in the file of this patent

UNITED STATES PATENTS

| | | |
|---|---|---|
| 92,210 | Richardson | June 6, 1869 |
| 2,583,427 | Holt | Jan. 22, 1952 |

FOREIGN PATENTS

| | | |
|---|---|---|
| 561,351 | Great Britain | May 16, 1944 |